(12) United States Patent
Elwood et al.

(10) Patent No.: US 6,332,523 B1
(45) Date of Patent: Dec. 25, 2001

(54) AXLE ASSEMBLY PARKING BRAKE MECHANISM

(75) Inventors: Paul D. Elwood, Sylvania, OH (US); Eric W. Swardson, Fort Wayne, IN (US)

(73) Assignee: Spicer Technologies, Inc., Fort Wayne, IN (US)

( * ) Notice: Subject to any disclaimer, the term of this patent is extended or adjusted under 35 U.S.C. 154(b) by 0 days.

(21) Appl. No.: 09/532,945

(22) Filed: Mar. 22, 2000

(51) Int. Cl.[7] .................................................. B60T 1/06
(52) U.S. Cl. ........................................ 192/219.6; 74/411.5
(58) Field of Search ................................ 192/218, 219.4, 192/219.5, 219.6; 74/411.5; 188/31, 74, 75, 76

(56) References Cited

U.S. PATENT DOCUMENTS

| | | | |
|---|---|---|---|
| 1,385,030 | * | 7/1921 | Watt .................................. 188/31 X |
| 1,903,199 | * | 3/1933 | Small ................................. 192/219.2 |
| 1,924,867 | | 8/1933 | Ljungstrom . |
| 2,072,764 | * | 3/1937 | McCoy .................................. 188/31 |
| 3,110,363 | | 11/1963 | Chapman . |
| 3,382,958 | | 5/1968 | Fagel . |
| 3,386,532 | | 6/1968 | Moss . |
| 3,439,786 | * | 4/1969 | Schmid ................................. 475/84 |
| 3,517,572 | * | 6/1970 | Schmid ................................ 475/240 |
| 3,621,957 | * | 11/1971 | Howe .............................. 192/218 X |
| 3,814,222 | | 6/1974 | Koivunen . |
| 4,457,187 | | 7/1984 | Tsuboi . |
| 4,475,638 | | 10/1984 | McCormick . |
| 4,662,489 | | 5/1987 | Honekamp et al. . |
| 5,183,138 | | 2/1993 | Jolliff . |
| 5,673,776 | | 10/1997 | Fitch et al. . |
| 5,687,611 | | 11/1997 | Sin et al. . |

* cited by examiner

*Primary Examiner*—Richard M. Lorence
(74) *Attorney, Agent, or Firm*—Liniak, Berenato, Longarce & White

(57) ABSTRACT

A brake mechanism for braking an axle shaft rotatably supported within an axle housing. A pair of arcuate brake pads are pivotally pinned within the axle housing such that each of the arcuate brake pads can pivot from an brake position engaging the axle shaft and a free position allowing the axle shaft to rotate freely. The arcuate brake pads are spring biased to the free position allowing axle rotation. A simply pulley system is arranged within the axle housing to allow remote actuation of the arcuate brake pads forcing the brake pads into the brake position to frictionally engage the axle shaft thereby providing a braking force. The axle shaft may be splined to engage a corresponding reverse spline profile formed on the inner surface of the arcuate brake pads to provide a positive braking force to lock the shaft preventing rotation. The brake arrangement is preferably employed to brake an input shaft in a differential assembly or in any drive shaft of a transfer case.

11 Claims, 3 Drawing Sheets

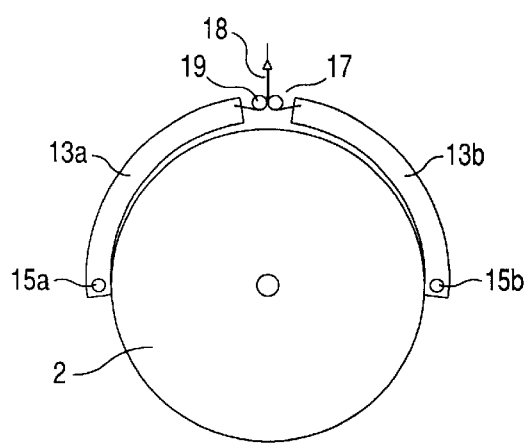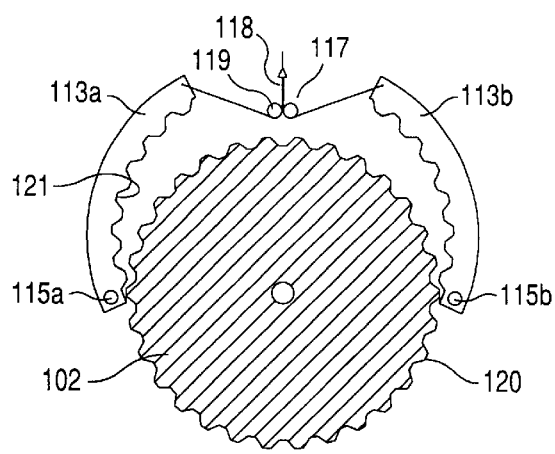
Fig. 2B
Fig. 3B

AXLE ASSEMBLY PARKING BRAKE MECHANISM

FIELD OF THE INVENTION

The present invention relates to a parking brake for an axle assembly and more particularly to a parking brake mechanism to brake an input shaft in an axle assembly.

DESCRIPTION OF THE RELATED ART

Parking brakes are well known in the art and many different arrangements have been proposed. In vehicles having rear drum brakes, an auxiliary actuator is employed to move the brake shoes in contact with the brake drum to provide parking brake force. It is also known to provide redundant braking arrangement which brake each of a drive axle adjacent the wheel end of the vehicle. Such is often the case for vehicles employing rear disc brakes. Other alternatives require complex systems to auxiliary implement the hydraulically actuated disc brake device. However, there are advantages to eliminating the need to provide a parking brake in the wheel ends.

It is also known to provide a brake torque band circumscribing a drive shaft to provide a braking force/differential lock in a power shift transmission. However, these systems do not disclose a brake arrangement to brake an input shaft in an axle assembly. Furthermore, the prior art devices require more complicated remote actuating mechanisms and a larger displacement of the actuator to obtain sufficient braking forced. Moreover, the prior art devices do not provide an adequate positive braking arrangement for an input shaft in an axle assembly.

SUMMARY OF THE INVENTION

It is an object of the invention to provide a parking brake for an axle assembly that is superior to the related art. The present invention is directed to a brake mechanism for braking an axle shaft rotatably supported within an axle housing. A pair of arcuate brake pads are pivotally pinned within the axle housing such that each of the arcuate brake pads can pivot from a brake position engaging the axle shaft and a free position allowing the axle shaft to rotate freely. The arcuate brake pads are spring biased to the free position allowing axle rotation. A simply pulley system is arranged within the axle housing to allow remote actuation of the arcuate brake pads forcing the brake pads into the brake position to frictionally engage the axle shaft thereby providing a braking force. The axle shaft may be splined to engage a corresponding reverse spline profile formed on the inner surface of the arcuate brake pads to provide a positive braking force to lock the shaft preventing rotation. The brake arrangement is preferably employed to brake an input shaft in a differential assembly or in any drive shaft of a transfer case.

BRIEF DESCRIPTION OF THE DRAWINGS

FIG. 2B is a sectional view of the brake mechanism of FIG. 2A in an open free position.

FIG. 3B is a sectional view of the brake mechanism of FIG. 3A in an open free position.

DETAILED DESCRIPTION OF THE PREFERRED EMBODIMENT

Figure 1:
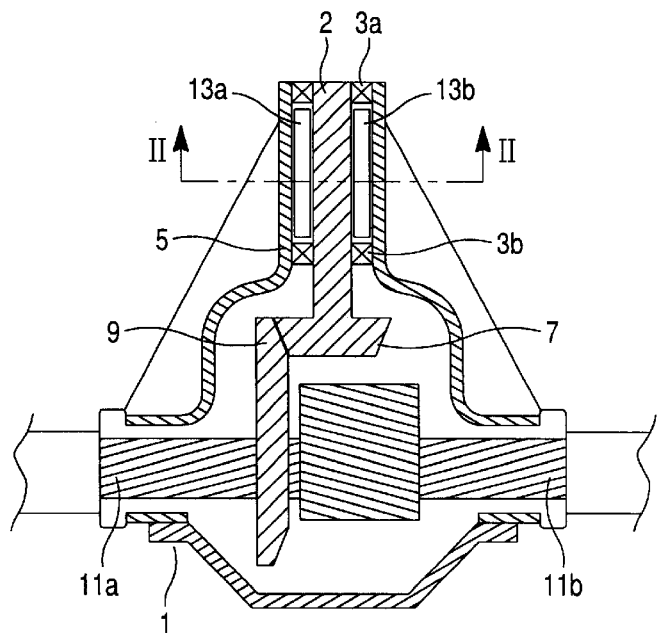
FIG. 1 is a sectional view of the brake mechanism of the present invention disposed within a differential axle assembly.

FIG. 1 depicts a sectional view of a differential axle assembly 1 employing the brake mechanism of the present invention. An input shaft 2 is rotatably disposed between a pair of bearings 3a, 3b within the differential housing 5 and is connected to a pinion gear 7 which drives a ring gear 9 of the differential assembly 1 thus allowing differential rotational speed of the two output shafts 11a, 11b. The differential assembly itself is conventional as is known in the art and is schematically represented. The detail of the side gears, pinion gears, differential casing etc. are not shown as they are well known in the art. A pair of brake pads 13a, 13b are disposed between the housing 5 and the pinion shaft 2 to provide selective braking force on the pinion shaft 2. The detail arrangement of the brake pads 13a, 13b in relation to the pinion shaft 2 are shown in FIGS. 2 and 3a as discussed below.

Figures 2A, 3A:
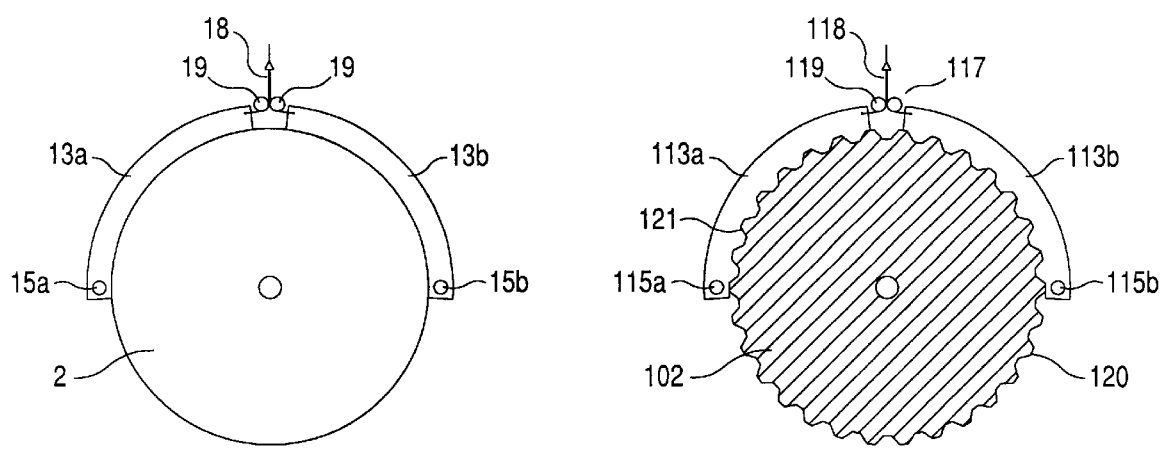
FIG. 2A is a sectional view of the brake mechanism according to the present invention taken along line II—II of FIG. 1 in a brake position.
FIG. 3A is a sectional view of the brake mechanism according to an alternative embodiment of the present invention in a brake position.

Referring now to FIG. 2A, a pair of arcuate brake pads 13a, 13b are pinned at a first end to the housing 5 via pins 15a, 15b to provide a pivotal relationship there between. Each of the brake pads 13a, 13b extend to a second end which converge adjacent one another to allow for simultaneous actuation. FIG. 2A depicts the brake pads 13a, 13b in a brake position where the brake pads 13a, 13b are forced to frictionally engage the outer peripheral surface of the pinion shaft 2 thereby providing a braking force to prevent the pinion shaft from rotating. FIG. 2B depicts the embodiment of FIG. 2A in an open position to allow free rotation of the pinion shaft 2 relative to the housing.

A pulley arrangement 17 is utilized to allow remote actuation of the brake mechanism. A cable enters 18 through the differential housing 5 from a remote location, typically in an accessible location relative to a driver of the vehicle, and is attached to each of the second ends of the brake pads 13a, 13b. The cable 18 splits and traverses a bearing surface 19 before being connected to each of the second ends of the arcuate brake pads 13a, 13b. Alternatively, two separate cables are implemented to connect to the brake pads 13a, 13b. Tension is simply applied to the cable and the brake pads are forced to engage pinion shaft 2 to apply a braking force thereon.

FIGS. 3A & 3B depict an alternate embodiment of the present invention. As in the previous embodiment two arcuate brake pads 113a, 113b members are disposed about the pinion shaft 102 and pivotally secured to the axle housing via pins 115a, 115b. The cable 118 and bearing surface 119 are similarly employed to force the brake pads 113a, 113b into engagement with the pinion shaft 102. However, in the alternate embodiment, rather than relying on a frictional contact between the pinion shaft 102 and brake pads 113a, 113b to lock the pinion shaft 102 from rotation, the pinion shaft 102 has longitudinal splines 120 circumscribing its outer peripheral surface. The arcuate brake pads 113a, 113b have formed along its inner surface corresponding splines 121 of reverse profile to engage the splines 120 of the pinion shaft 102. When it is desired to lock the pinion shaft 102, the cable 118 is pulled and the brake pads 113a, 113b are forced down to engage the pinion shaft 102. As shown in FIG. 3B, the spline interface between the pinion shaft 102 and the brake pads 113a, 113b provide a positive locking force.

Each of the embodiments of the present invention has associated benefits. The first embodiment of FIG. 2A & 2B requires little displacement of the arcuate pads 13a, 13b and cable 18 to move the brake pads 13a, 13b between the open and locked position. Once the cables 18 are calibrated to within tolerances, a relatively small displacement of the cable 18 will cause the brake pads 13a, 13b to lock the pinion shaft 2. However, because of the splines 120, 121 of FIG. 3A, & 3B, the brake pads 113a, 113b must be displaced slightly further to allow the splines 120, 121 to completely disengage. However, the spline interface of FIGS. 3A & 3B provide a positive braking action that does not rely solely on frictional contact between the brake pads 113a, 113b and the pinion shaft 102.

The materials used to manufacture the differential housing 5, pinion shaft 2 and associated parts of the differential are as is conventionally known in the art. The brake pads 13, 13b of FIGS. 2A & 2B are preferably similarly manufactured as conventional drum brake pads with the brake surface in its inner surface as opposed to the external surface. Preferably the brake pads 13a, 13b are lined with a steel backing and mounted thereon is a brake lining as known in the art.

The bearing surfaces 19, 119 may be simply a shoulder portion formed in the inner surface of the housing to brunt the force of the changing direction of the cable under tension. However, roller elements such as a pulley type member or cylindrical rolling member may be employed to alleviate frictional wear between the cable 18, 118 and bearing surface 19, 119.

The brake pads 113a, 113b of the embodiment of FIGS. 3A & 3B may be made of any suitable strong material such the very same material used to form gearing such as steel or the like. The material need only be sufficiently strong enough to endure the shear loads applied to the spline teeth when in the locked position.

The pivotal mounting of the brake pads to the inner surface of the housing may also be of several suitable connections. A transversely mounted pin 15a, 15b may be simply welded to the inner surface of the housing interconnected by a simply bracket or other protruding device. So long as the brake pads are able pivot between a closed position and open position as illustrated in the drawings.

It is noted that the clearance between the brake pads and the pinion shaft and the necessary displacement of the brake pads shown in the drawings are somewhat exaggerated for illustration purposes. The brake pads are preferably made sufficiently thin and the clearance sufficiently tight so as to not significantly increase the necessary size of the housing.

Figure 4:
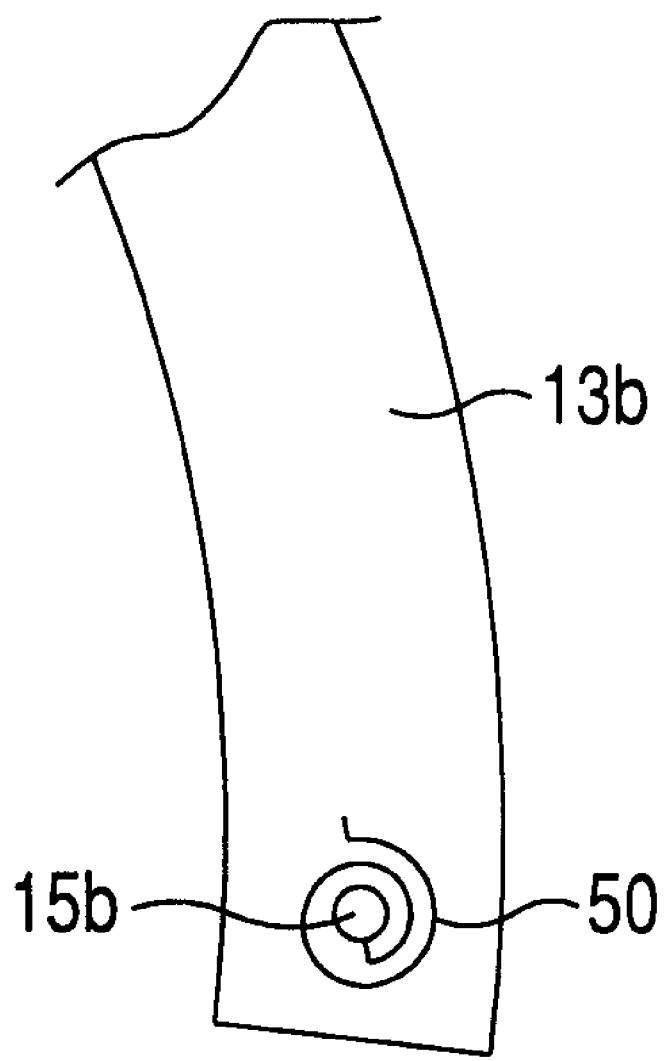
FIG. 4 is an enlarged view of the brake pad and connecting pin schematically showing the torsion spring.

A torsion spring 50 may be disposed about a pin connecting the arcuate brake pads to the housing to bias the brake pads in a free position to allow the axle shaft to rotate freely. (One of the springs being shown in FIG. 4.)

While the foregoing invention has been shown and described with reference to a preferred embodiment, it will be understood by those possessing skill in the art that various changes and modifications may be made without departing from the spirit and scope of the invention. For example while the present invention has been shown and described for use in a differential axle assembly, the brake mechanism may be employed to brake torque in a transfer case assembly whereby the brake pads of the present are pinned to the transfer case housing to engage any one or more of the input shaft, rear output shaft, and or front output shafts. This arrangement serves to lock the transfer case and not allow relative motion between the input, front and rear output shafts.

What is claimed is:

1. A brake mechanism in combination with a drive axle shaft rotatably disposed within an axle housing, said brake mechanism comprising:

at least one substantially rigid arcuate brake pad pivotally mounted at a single location within said axle housing between an open position and a brake position, wherein when in said open position said brake pad allows free rotation of said drive axle shaft and when in said brake position engages said drive to provide a brake force to prevent rotation of said drive axle;

a spring connected to said arcuate brake pad and biasing said arcuate brake pad to said open position; and an actuator connected to said arcuate brake pad to allow remote actuation of said brake mechanism forcing said arcuate brake pad to said brake position.

2. The brake mechanism according to claim 1, wherein said drive axle shaft is an input pinion shaft disposed within a differential axle assembly allowing differential rotation between a pair of output shafts.

3. The brake mechanism according to claim 1, wherein said spring is a torsion spring disposed about a pin connecting said arcuate brake pad to said housing.

4. The brake mechanism according to claim 1, wherein an outer peripheral surface of said drive axle shaft is formed with longitudinal splines and an inner surface of said brake pad is formed with corresponding splines having a profile to engage said longitudinal splines of said drive axle thereby providing a positive braking action when in said brake position.

5. The brake mechanism according to claim 1, wherein said brake pad has a first end and a second end opposite thereto, said first end being pinned to said axle housing to define said pivotal mount, said actuator including a cable connected to said second end of said brake pad extending to a remote location and a bearing surface disposed adjacent said second end of said brake pad and engaging said cable, wherein when sufficient tension is applied to said cable from said remote location, said cable pulls said brake pad to said brake position.

6. A brake mechanism in combination with a drive axle shaft rotatably disposed within an axle housing, said brake mechanism comprising:

a pair of substantially rigid arcuate brake pads each disposed between said axle housing and said drive axle and each being pivotally pinned at a first end thereof to said axle housing between a brake position engaging said drive axle and an open position allowing free rotation of said drive axle;

a pair of springs one connected to each of said arcuate brake pads to bias said brake pads in said open position;

a cable actuator connected a second end of each of said pair of arcuate brake pads, said actuator being provided to remotely actuate said mechanism by forcing said arcuate brake pads to said brake position.

7. The brake mechanism according to claim 6, wherein said drive axle shaft is an input pinion shaft disposed within a differential axle assembly allowing differential rotation between a pair of output shafts.

8. The brake mechanism according to claim 6, wherein said springs are a torsion spring disposed about a pin connecting said arcuate brake pads to said housing.

9. The brake mechanism according to claim 6, wherein an outer peripheral surface of said drive axle is formed with longitudinal splines and an inner surface of said brake pads are formed with corresponding splines having a profile to engage said longitudinal splines of said drive axle thereby providing a positive braking action when in said brake position.

10. The brake mechanism according to claim 6, wherein said brake pads each have a first end and a second end opposite thereto, said first ends each being pinned to said axle housing to define said pivotal mount, said actuator including a cable connected to said second ends of said brake pad and extending to a remote location, a bearing surface is disposed adjacent said second end of said brake pad and engages said cable, wherein when sufficient tension is applied to said cable from said remote location, said cable pulls said brake pads to said brake position.

11. A brake mechanism in combination with a drive axle shaft rotatably disposed within an axle housing, said brake mechanism comprising:

a pair of substantially rigid arcuate brake pads having a first end pivotally mounted within said axle housing at a location adjacent opposite points of said drive axle between an open position and a brake position, said brake pads having a second end extending toward and terminating adjacent one another, wherein when in said open position said brake pads allow free rotation of said drive axle shaft and when in said brake position engages said drive axle to brake said drive axle;

a biasing means to bias said brake pads to said open position; and an actuator connected to said arcuate brake pad to allow remote actuation of said brake mechanism forcing said arcuate brake pad to said brake position.

* * * * *